United States Patent
Li et al.

(10) Patent No.: US 10,456,857 B2
(45) Date of Patent: Oct. 29, 2019

(54) ELECTRON BEAM MELTING AND CUTTING COMPOSITE 3D PRINTING APPARATUS

(71) Applicant: Yuanmeng Precision Technology (Shenzhen) Institute, Shenzhen, Guangdong (CN)

(72) Inventors: Junqi Li, Guangdong (CN); Qing Liu, Guangdong (CN); Yi Xu, Guangdong (CN); Miaoan Ouyang, Guangdong (CN); Yan Nie, Guangdong (CN); Hu Yang, Guangdong (CN)

(73) Assignee: Yuanmeng Precision Technology (Shenzhen) Institute, Shenzhen, Guangdong (CN)

( * ) Notice: Subject to any disclaimer, the term of this patent is extended or adjusted under 35 U.S.C. 154(b) by 684 days.

(21) Appl. No.: 15/110,544

(22) PCT Filed: Mar. 31, 2015

(86) PCT No.: PCT/CN2015/075600
§ 371 (c)(1),
(2) Date: Jul. 8, 2016

(87) PCT Pub. No.: WO2016/154931
PCT Pub. Date: Oct. 6, 2016

(65) Prior Publication Data
US 2017/0050261 A1  Feb. 23, 2017

(51) Int. Cl.
*B23K 15/08* (2006.01)
*B23K 15/00* (2006.01)
(Continued)

(52) U.S. Cl.
CPC ........ *B23K 15/0086* (2013.01); *B22F 3/1055* (2013.01); *B23K 15/002* (2013.01);
(Continued)

(58) Field of Classification Search
CPC .. B23K 15/0086; B23K 15/002; B23K 15/08; B23K 26/0807; B33Y 30/00;
(Continued)

(56) References Cited

U.S. PATENT DOCUMENTS

| 4,323,756 A * | 4/1982 | Brown | ..................... | B22F 3/006 |
| | | | | 219/121.66 |
| 4,429,401 A * | 1/1984 | Avicola | ................. | H01J 37/305 |
| | | | | 373/12 |

(Continued)

FOREIGN PATENT DOCUMENTS

| CN | 103551572 A | 2/2014 |
| CN | 203427331 U | 2/2014 |

(Continued)

OTHER PUBLICATIONS

International Search Report and Written Opinion on corresponding PCT application (PCT/CN2015/075600) from International Searching Authority (CN) dated Jan. 7, 2016.

*Primary Examiner* — Chee-Chong Lee
(74) *Attorney, Agent, or Firm* — Klein, O'Neill & Singh, LLP

(57) ABSTRACT

The present application relates to the technical field of 3D printing apparatus, and discloses an electron beam melting and cutting composite 3D printing apparatus which comprises a box and an electron beam gun, in which the box has a cavity formed therein, the cavity is provided therein with a cutting structure, a first Y-direction guide rail and a Y-direction movable platform, the electron beam gun has an emitting head formed in the cavity, the Y-direction movable platform is provided thereon with a Z-direction movable platform, the Z-direction movable platform is provided thereon with a powder spreading structure, the cutting structure has a cutting head, a shielding case is arranged between the emitting head and the Z-direction movable (Continued)

platform, the emitting head of the electron beam gun is inserted in an upper opening of the shielding case, and a lower opening of the shielding case is aligned with the Z-direction movable platform.

6 Claims, 4 Drawing Sheets

(51) Int. Cl.
    *B33Y 30/00*     (2015.01)
    *B33Y 40/00*     (2015.01)
    *B22F 3/105*     (2006.01)
    *B22F 3/24*     (2006.01)

(52) U.S. Cl.
    CPC ............. *B23K 15/08* (2013.01); *B33Y 30/00* (2014.12); *B33Y 40/00* (2014.12); *B22F 2003/1056* (2013.01); *B22F 2003/247* (2013.01); *B22F 2201/20* (2013.01); *Y02P 10/295* (2015.11)

(58) Field of Classification Search
    CPC ............. B33Y 40/00; B22F 3/1055; B22F 2003/1056; B22F 2003/247; B22F 2201/20
    USPC ............ 219/121.62, 121.76, 121.73, 121.75, 219/76.12; 264/259, 401, 308, 485, 497; 156/630; 425/174.4

See application file for complete search history.

(56) References Cited

U.S. PATENT DOCUMENTS

| | | | | |
|---|---|---|---|---|
| 4,794,259 | A * | 12/1988 | Sanderson | B23K 15/0013 219/121.3 |
| 7,073,561 | B1 * | 7/2006 | Henn | B22F 3/003 164/271 |
| 7,168,935 | B1 * | 1/2007 | Taminger | B23K 15/0073 219/121.12 |
| 2002/0105114 | A1 * | 8/2002 | Kubo | B29C 64/153 264/497 |
| 2003/0075836 | A1 * | 4/2003 | Fong | B29C 41/46 264/401 |
| 2011/0061591 | A1 * | 3/2011 | Stecker | B22F 3/1055 118/663 |
| 2014/0271961 | A1 | 9/2014 | Khoshnevis | |

FOREIGN PATENT DOCUMENTS

| | | |
|---|---|---|
| CN | 203817392 U | 9/2014 |
| CN | 104741609 A | 7/2015 |
| CN | 204584273 U | 8/2015 |

\* cited by examiner

ELECTRON BEAM MELTING AND CUTTING COMPOSITE 3D PRINTING APPARATUS

TECHNICAL FIELD

The present application relates to the technical field of 3D (three-dimensional) printing apparatuses, and more particularly, relates to an electron beam melting and cutting composite 3D printing apparatus.

BACKGROUND

Metal melting 3D printing technology (Selective Laser Melting, SLM) is a kind of technology using high-brightness laser to directly melt metal power materials, and directly forming a component with any complicated structure, which has properties similar to a casting, via a 3D model, without adhesives.

By means of the metal melting 3D printing technology, a component having a strength level reaching that of a casting can be formed. However, the formed component has a large shape error and a poor surface finish; therefore, the formed component needs to be machined secondarily using a traditional machining method, only by this can the component obtain a shape and a surface accuracy meeting the requirements of aviation manufacturing industry.

In the prior art, an electron beam melting and cutting composite technology is adopted to combine the metal melting with cutting machining. The electron beam melting and cutting composite technology uses a high-power electron beam gun to directly melt the metal powder material in a vacuum chamber, and a component having any complicated structure and properties similar to a forging is directly formed via a 3D model without adhesives. Besides, by performing a printing operation and a cutting operation at the same time, a surface figure accuracy of the finally formed structural component can directly meet the usage requirements.

However, the electron beam gun has to be used in a vacuum environment and a high temperature is generated during the forming process; therefore, the cutting manners in the vacuum environment may be greatly restricted; firstly, the high temperature generated when the electron beam gun melts the metal powder has a heat effect on other elements inside the vacuum chamber; secondarily, due to the temperature variation in the vacuum chamber the structural component will undergo stress deformation during the cutting process.

BRIEF SUMMARY

The objective of the present application is to provide an electron beam melting and cutting composite 3D printing apparatus, aiming at the drawbacks in the prior art that a high temperature is generated when a electron beam gun melts metal powder, and the high temperature has a heat effect on other elements inside the vacuum chamber and causes stress deformation of the structural component machined by cutting.

The present invention is realized as follows: an electron beam melting and cutting composite 3D printing apparatus, which comprises a box and an electron beam gun; wherein the box has a cavity in a vacuum state formed therein; the cavity is provided therein with a cutting structure, a first Y-direction guide rail and a Y-direction movable platform movably connected to the first Y-direction guide rail and movable along the first Y-direction guide rail; the electron beam gun is arranged outside the box, and has an emitting head configured for emitting an electron beam; the emitting head is formed in the cavity; the Y-direction movable platform is provided thereon with a Z-direction movable platform movable up and down with respect to Y-direction movable platform; the Z-direction movable platform is provided thereon with a powder spreading structure configured for spreading metal powder onto the Z-direction movable platform; the cutting structure is arranged at a side of the emitting head of the electron beam gun, and has a cutting head configured for cutting a structural component formed by melting the metal powder; a shielding case is arranged between the emitting head and the Z-direction movable platform, and an upper end of the shielding case is smaller than a lower end of the shielding case; a through-cavity running through the upper end and the lower end of the shielding case is defined in the shielding case; the emitting head of the electron beam gun is inserted in an upper opening of the shielding case, and a lower opening of the shielding case is aligned with the Z-direction movable platform.

Further, a periphery of the Y-direction movable platform is provided with an enclosed wall extending upwardly; an opening area is formed on an upper end of the enclosed wall, and the opening area of the enclosed wall is aligned with the lower opening of the shielding case.

Further, the lower end of the shielding case is abutted against the upper end of the enclosed wall.

Further, the Y-direction movable platform is provided with a driving element and a Z-direction rod driven by the driving element to move up and down; the Z-direction rod is connected to the Z-direction movable platform.

Further, the Y-direction movable platform is provided with a plurality of Z-direction positioning rods, and the plurality of Z-direction positioning rods movably run through the Z-direction movable platform.

Further, the plurality of Z-direction positioning rods are arranged around a periphery of the Z-direction rod.

Further, the Z-direction movable platform is provided with two powder spreading structures, and the two powder spreading structures are arranged to be spaced from and parallel to each other.

Further, the powder spreading structure includes a powder magazine arranged above the Z-direction movable platform and moving horizontally on the Z-direction movable platform; a lower end of the powder magazine is provided with a leakage hole strip configured for allowing the metal powder to leak out.

Further, the cutting structure includes the cutting head and a three-axis movable structure configured for driving the cutting head to move in space.

Further, the three-axis movable structure includes a Y-direction movable rod, an X-direction movable block, and a Z-direction movable head; wherein the cavity is further provided therein with a second Y-direction guide rail, the second Y-direction guide rail is parallel to the first Y-direction guide rail, and is located above the first Y-direction guide rail; the Y-direction movable rod is movably connected to the second Y-direction guide rail; the Y-direction movable rod is provided thereon with an X-direction guide rail extending in the X direction; the X-direction movable block is movably connected to the X-direction guide rail; the X-direction movable block is provided thereon with a Z-direction guide rail extending in the Z direction; the Z-direction movable head is movably connected to the Z-direction guide rail, and the cutting head is connected to the Z-direction movable head.

Compared with the prior art, the electron beam melting and cutting composite 3D printing apparatus provided by the present application uses the powder spreading structure to spread metal powder onto the Z-direction movable platform to form a metal powder layer, and uses the emitting head of the electron beam gun to emit an electron beam to melt the metal powder layer on the Z-direction movable platform, thereby forming a structural component. Besides, along with the movement of the Y-direction movable platform, the Z-direction movable platform is moved to a position below the cutting structure; by the movement of the cutting heading of the cutting structure in space, the structural component on the Z-direction movable platform is cut, such that properties, such as surface accuracy, of the machined structural component meet the usage requirements. Besides, since shielding is formed between the emitting head of the electron beam gun and the Z-direction movable platform, when the electron beam gun emits an electron beam to perform melting machining, the generated heat of the high temperature is confined in the shielding case, which reduces the heat effect on other elements inside the cavity. Moreover, when using the cutting head to perform cutting machining, it can ensure that the temperature in the cutting area is constant, and thus the stress deformation of the structural component caused by a temperature variation during the forming process is reduced.

DETAILED DESCRIPTION OF THE PREFERRED EMBODIMENT

In order to make the objective, the technical solution and the advantages of the present application more clear, the present application is further explained in detail with reference to the accompanying drawings and embodiments. It should be understood that, the specific embodiments described herein are only used for explaining the present application, and are not a limitation to the present application.

The implementation of the present application is described in detail with reference to the specific embodiments in the following.

Figure 1:
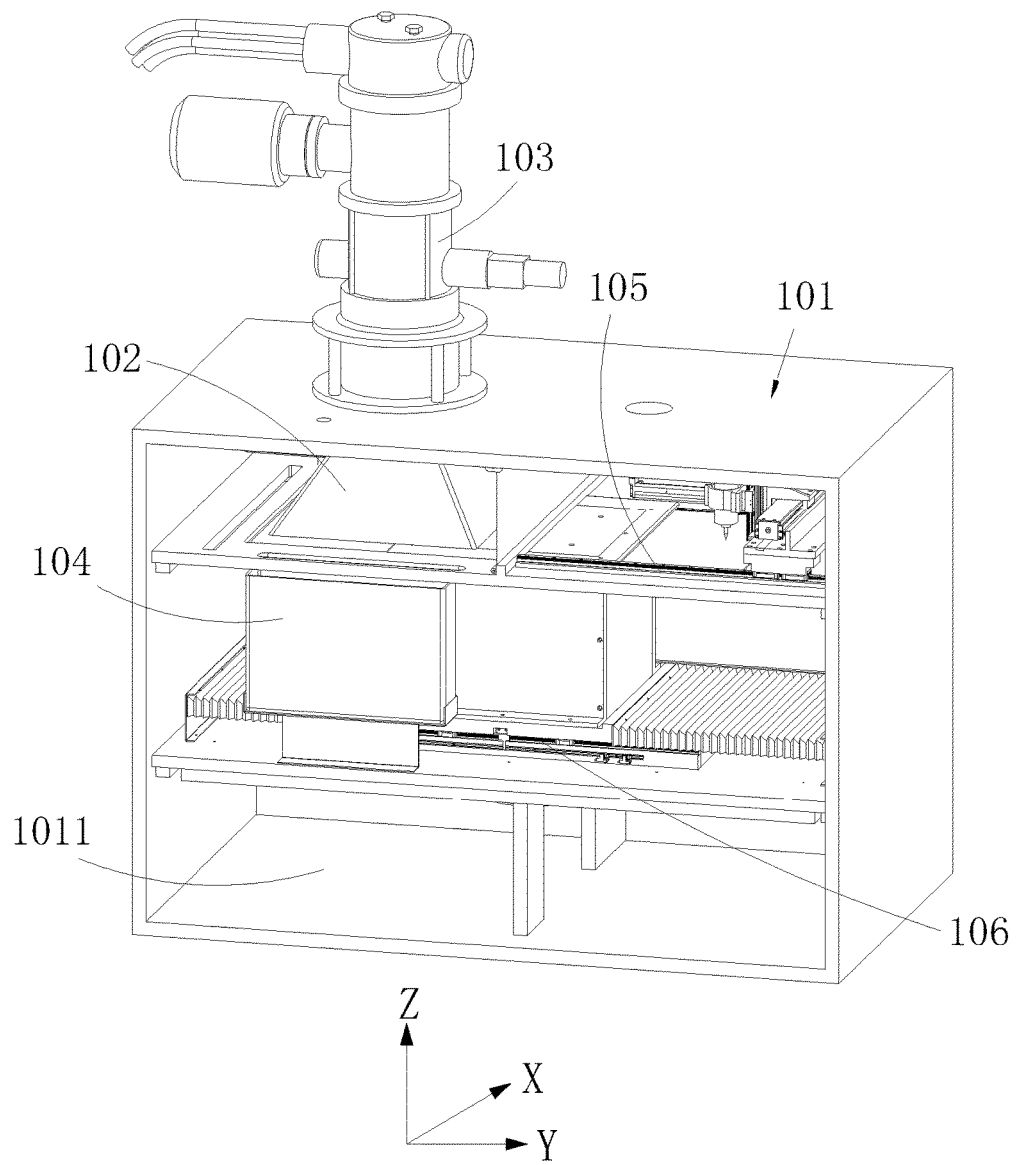
FIG. 1 is a perspective schematic view of an electron beam melting and cutting composite 3D printing apparatus provided by an embodiment of the present application.
Figure 2:
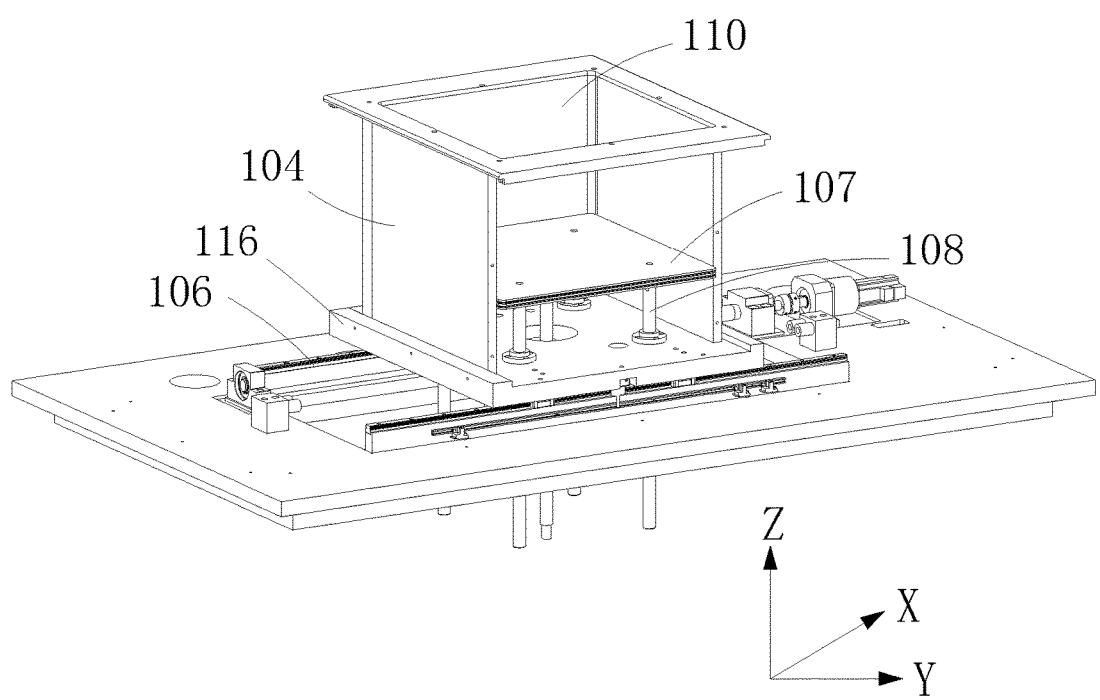
FIG. 2 is a partial perspective schematic view of the electron beam melting and cutting composite 3D printing apparatus provided by the embodiment of the present application.
Figure 3:
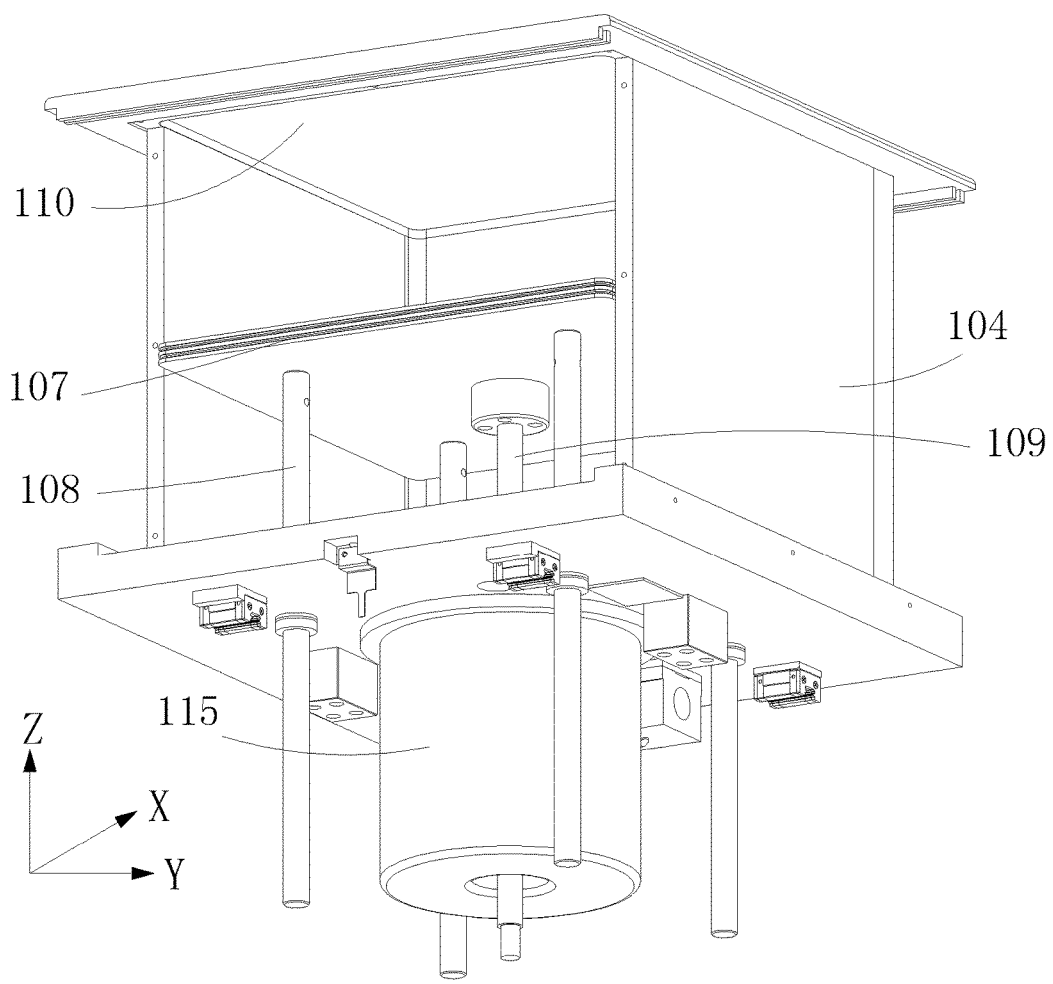
FIG. 3 is another perspective schematic partial view of the electron beam melting and cutting composite 3D printing apparatus provided by the embodiment of the present application.
Figure 4:
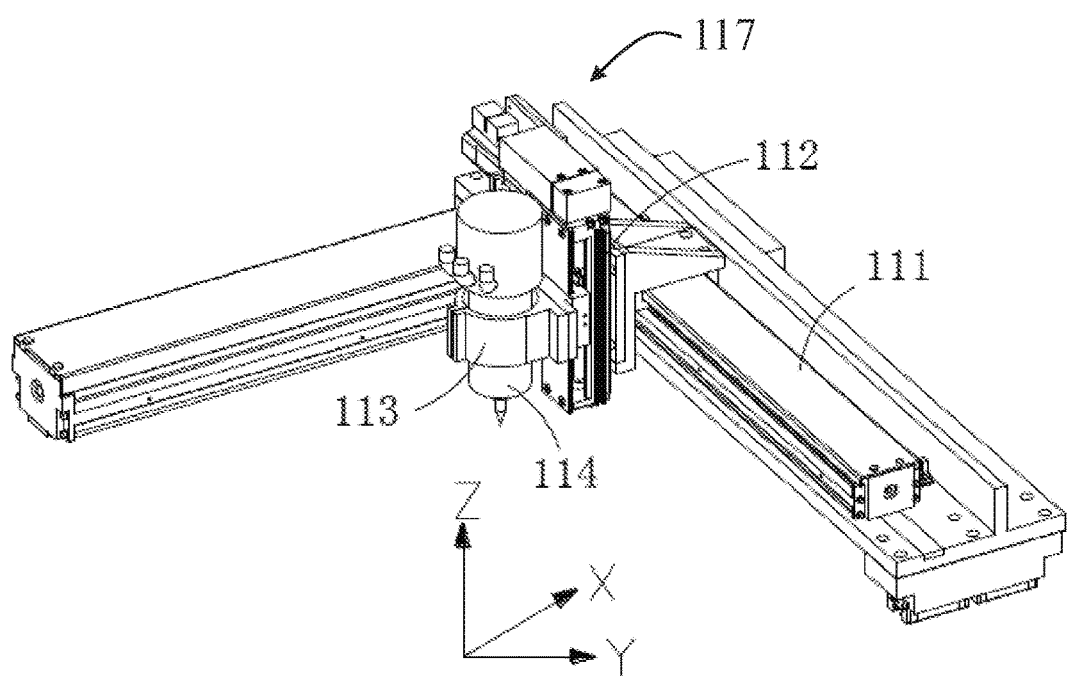
FIG. 4 is a schematic view of the cutting structure provided by the embodiment of the present application.

FIGS. 1-4 show a preferred embodiment provided by the present application.

An electron beam melting and cutting composite 3D printing apparatus provided by the present embodiment comprises a box 101, an electron beam gun 103, a cutting structure, a first Y-direction guide rail 106 and a Y-direction movable platform 116. The box 101 has a cavity 1011 in a vacuum state formed therein. In this case, the vacuum state means that the environmental pressure in the cavity 1011 is $1\times10^{-1}$ pa-$1\times10^{-3}$ pa, but not in an absolute vacuum state. The electron beam gun is formed outside the box 101, and has an emitting head configured for emitting an electron beam. The emitting head is formed in the cavity 1011 of the box 101, and is located above the first Y-direction guide rail 106. In this way, it can ensure that the electron beam emitted from the emitting head of the electron beam gun 103 can be positioned in the cavity 1011. The first Y-direction guide rail 106 is formed in the cavity 1011 and arranged transversely. The Y-direction movable platform 116 is movably connected to the Y-direction guide rail 106, and can move transversely along the first Y-direction guide rail 106. The Y-direction movable platform 116 is provided thereon with a Z-direction movable platform 107. The Z-direction movable platform 107 is formed on the Y-direction movable platform 116, and can move up and down in a longitudinal direction with respect to the Y-direction movable platform 116. The cutting structure is located above the Y-direction guide rail 106, and further located at a side of the emitting head of the electron beam gun 103. The cutting structure includes a cutting head 114 movable in space.

A powder spreading structure configured for spreading metal powder onto the Z-direction movable platform 107 is further arranged in the cavity 1011 of the box 101. In this way, when the powder spreading structure spreads metal powder on the Z-direction movable platform 107 successively, the emitting head of the electron beam gun 103 emits electron beams successively to melt the metal powder on the Z-direction movable platform 107.

The basic operation processes of the electron beam melting and cutting composite 3D printing apparatus are described as follows:

1) Metal powder is put into the powder spreading structure.

2) The box 101 is evacuated in such a way that a pressure in the cavity 1011 reaches to a required vacuum degree.

3) The powder spreading structure is used to spread the metal powder onto the Z-direction movable platform 107, such that the metal powder forms a metal powder layer on the Z-direction movable platform 107 s.

4) The electron beam gun 103 is used to emit an electron beam to melt the metal powder on the Z-direction movable platform 107.

5) By means of the movement of the Y-direction movable platform 116, the Z-direction movable platform 107 is moved to a position below the cutting structure.

6) The cutting head 114 is used to cut the structural component formed on the longitudinal platform.

7) The Y-direction movable platform 116 moves back to a position below the emitting head of the electron beam gun 103, and the cut structural component on the Z-direction movable platform 107 moves along therewith.

8) The steps 4) to 7) are repeated until the whole structural component is printed and the machined completely.

9) The machined structural component is taken out from the cavity 1011 of the box 101.

When the electron beam gun emits an electron beam to melt the metal powder on the Z-direction movable platform 107, a high temperature may be generated. In order to avoid the high temperature from affecting the ambience, in this embodiment, the electron beam melting and cutting composite 3D printing apparatus further includes a shielding case 102. A cross-section of an upper end of the shielding case 102 is smaller than that of a lower end of the shielding case 102, and a through-cavity running through the upper end and the lower end of the shielding case 102 is defined in the shielding case 102. The upper end of the shielding case 102 defines an upper opening, while the lower end of the shielding case 102 defines a lower opening. The shielding case 102 is arranged between the emitting head of the electron beam gun and the Z-direction movable platform 107. The emitting head of the electron beam gun is inserted in the upper opening of the shielding case 102, while the lower opening of the shielding case 102 is aligned with the Z-direction movable platform 107.

In the electron beam melting and cutting composite 3D printing apparatus provided by the present application, the powder spreading structure is used to spread metal powder onto the Z-direction movable platform 107 to form a metal powder layer, and the emitting head of the electron beam gun is used to emit an electron beam to melt the metal powder layer on the Z-direction movable platform 107, thereby forming a structural component. Besides, along with the movement of the Y-direction movable platform 116, the Z-direction movable platform 107 is moved to a position below the cutting structure; by the movement of the cutting heading 114 of the cutting structure in space, the structural component on the Z-direction movable platform 107 is cut, such that properties, such as surface accuracy, of the machined structural component meet the usage requirements.

Since the shielding case 102 is formed between the emitting head of the electron beam gun 103 and the Z-direction movable platform 107, when the electron beam gun 103 emits an electron beam to perform melting machining, the generated heat of the high temperature is confined in the shielding case 102, which reduces the heat effect on other elements inside the cavity 1011. Moreover, when using the cutting head 114 to perform a cutting machining, it is can ensure that the temperature in the cutting area is constant, and thus the stress deformation of the structural component caused by a temperature variation during the forming process is reduced.

When the electron beam gun 103 emits an electron beam to melt the metal powder, in order to further prevent the generated high-temperature heat from leaking out, in this embodiment, a periphery of the Y-direction movable platform 116 is provided with an enclosed wall 104 extending upwardly. The enclosed wall 104 is arranged around the periphery of the Y-direction movable platform 116, and an opening area 110 is formed on an upper end of the enclosed wall 104. The upper end of the enclosed wall 104 is aligned with the lower end of the shielding case 102, while the opening area 110 of the enclosed wall 104 is aligned with the upper opening of the shielding case 102. In this way, under the restriction of the enclosed wall 104, a completely enclosed area is formed by the enclosed wall 104 and the whole shielding case 102, and thus it can greatly reduce the amount of the high-temperature heat generated in the enclosed area that leaks out.

In specific, the upper end of the enclosed wall 104 is abutted against the lower end of the shielding case 102, as a result, a completely closed enclosing area is formed. Alternatively, a relative small gap can also be formed between the upper end of the enclosed wall 104 and the lower end of the shielding case 102, and thus it can ensure that there is no interference between the enclosed wall 104 and the shielding case 102 during the movement of the Y-direction movable platform 116.

In this embodiment, a driving element 115 is connected to the Y-direction movable platform 116, a Z-direction rod 109 is connected to the driving element 115, and the Z-direction rod 109 is further connected to the Z-direction movable platform 107. In this way, the driving element 115 is configured for driving the Z-direction rod 109 to move up and down, and thus the Z-direction rod 109 can drive the Z-direction movable platform 107 to move up and down.

After the powder spreading structure spreads a layer of metal powder on the Z-direction movable platform 107, the electron beam 103 further performs melting machining to the metal powder; after the cutting head 114 performs cutting machining on the melt structural component, the Y-direction movable platform 116 moves back, and the Z-direction movable platform 107 moves downwardly under the driving of the driving element 115 and the Z-direction rod 109, such that the powder spreading structure can re-spread metal powder on the machined structural component. That is, the Z-direction movable platform 107 moves downwardly and gradually as the machining processes continuously proceed.

That is, the Z-direction movable platform 107 lowers a certain distance every time after a layer is printed. Since the formed structural component is fixed on the Z-direction movable platform 107 and can be taken down only after the structural component is completely formed, the Y-direction movable platform 116 needs to drive the Z-direction movable platform 107 to move along therewith.

In this embodiment, the driving element 115 can be a cylinder. Under the driving of the cylinder, the Z-direction rod 109 moves up and down. Alternatively, in other embodiments, the structure configured to drive the Z-direction movable platform 107 to move up and down can also be many other types of driving structures.

In specific, the Y-direction movable platform 116 is provided with a plurality of Z-direction positioning rods 108. The plurality of Z-direction positioning rods 108 are spaced from each other and movably run through the Z-direction movable platform 107. In this way, when the Z-direction movable platform 107 moves up and down, the Z-direction positioning rods 108 can provides a positioning to the longitudinal movement of the Z-direction movable platform 107.

The plurality of the Z-direction positioning rods 108 are arranged around the periphery of the Z-direction rod 109. Alternatively, the plurality of the Z-direction positioning rods 108 can also be arranged in other shapes.

The powder spreading structure further includes a movable powder magazine arranged above the Z-direction movable platform 107. The powder magazine moves along a direction parallel to the Z-direction movable platform 107; that is, the powder magazine moves horizontally on the Z-direction movable platform 107. A lower end of the powder magazine is provided with a leakage hole strip. In this way, during the movement of the powder magazine, the metal powder inside the powder magazine falls through the leakage hole strip, and further forms a metal powder layer on the Z-direction movable platform 107.

In order to spread powder more efficiently, in this embodiment, two aforesaid powder spreading structures are arranged above the Z-direction movable platform 107. The two powder spreading structures are spaced from and parallel to each other, and are interactively operated at an interval.

Alternatively, in other embodiments, the powder spreading structure can also be other structures, such as a structure for spreading metal powder on the Z-direction movable platform 107 using the movement of a scraper or the like. The powder spreading structure is not limited to the structure described in this embodiment.

In this embodiment, the cutting structure includes a three-axis movable structure 117 and the cutting head 114. Wherein, the three-axis movable structure 117 includes a Y-direction movable rod 111, an X-direction movable block 112, and a Z-direction movable head 113. Wherein, a second Y-direction guide rail 105 is further arranged in the cavity 1011 of the box 101, the second Y-direction guide rail 105 is located above the first Y-direction guide rail 106. The Y-direction movable rod 111 is movably connected to the second Y-direction guide rail 105, and can move along the second Y-direction guide rail 105. The Y-direction movable rod 111 is arranged to extend in the X direction, and an X-direction guide rail extending in the X direction is formed on the Y-direction movable rod 111. The X-direction movable block 112 is connected to the X-direction guide rail, and can move along the X-direction guide rail. A Z-direction guide rail is arranged on the X-direction movable block 112. The Z-direction movable head 113 is connected to the Z-direction guide rail, and can move along the Z direction. The cutting head 114 is i connected to the Z-direction movable head 113. In this way, with the movements of the Y-direction movable rod 111, the X-direction movable block 112, and the Z-direction movable head 113, the spatial movement of the cutting head 114 can be realized.

Because the guide rails are used in a vacuum environment, the internal lubrication for the guide rails should use lubricating greases for vacuum environments, in order to prevent common lubricating greases from volatizing in vacuum environments.

In this embodiment, the electron beam gun 103 includes an electron beam generator and a coil. In the emitting head formed by the coil, an electron beam is emitted from the electron beam gun, and the electron beam is further deflected to proceed X-Y movements in a plane under the control of the magnetic field generated by the coil. In this embodiment, the X direction, the Y direction and the Z direction are the directions shown by XYZ coordinates shown in the figures. Of course, according to the practical application, when the positioning orientations of electron beam melting and cutting composite 3D printing apparatuses are different, the corresponding coordinates will be changed, and the coordinates are not limited to the coordinates shown in this embodiment. The embodiments described above are only preferred embodiments of the present application, and are not used to limit the present application. Any modification, alternative or improvements made within the spirit and the principle of the present application belongs to the protection of the present application.

The invention claimed is:

1. An electron beam melting and cutting composite 3D printing apparatus, comprising:
    a box defining a cavity in a vacuum state, the cavity containing a cutting structure, a first Y-direction guide rail, a Y-direction movable platform movably connected to the first Y-direction guide rail and movable along the first Y-direction guide rail, and a second Y-direction guide rail parallel to the first Y-direction guide rail and located above the first Y-direction guide rail, wherein the Y-direction movable platform is provided thereon with a Z-direction movable platform that is movable up and down with respect to the Y-direction movable platform and configured for metal powder to be spread thereon;
    an electron beam gun mounted on the box and configured to emit an electron beam into the cavity to melt the metal powder spread on the Z-direction movable platform, wherein the cutting structure comprises a cutting head configured for cutting a structural component formed by the melted metal powder on the Z-direction movable platform;
    a three-axis movable structure in the cavity and configured for driving the cutting head to move in space, wherein the three-axis movable structure comprises a Y-direction movable rod, an X-direction movable block, and a Z-direction movable head, wherein the Y-direction movable rod is movably connected to the second Y-direction guide rail and is provided thereon with an X-direction guide rail extending in the X direction, wherein the X-direction movable block is movably connected to the X-direction guide rail and is provided thereon with a Z-direction guide rail extending in the Z direction, wherein the Z-direction movable head is movably connected to the Z-direction guide rail, and wherein the cutting head is connected to the Z-direction movable head; and
    a shielding case arranged in the cavity between the electron beam gun and the Z-direction movable platform, wherein the shielding case defines a through-cavity between an upper opening and a lower opening of the shielding case, wherein the upper opening of the shielding case is aligned with the electron beam gun, and the lower opening of the shielding case is aligned with the Z-direction movable platform.

2. The electron beam melting and cutting composite 3D printing apparatus according to claim 1, wherein a periphery of the Y-direction movable platform is provided with an enclosed wall extending upwardly; an opening area is formed on an upper end of the enclosed wall, and the opening area of the enclosed wall is aligned with the lower opening of the shielding case.

3. The electron beam melting and cutting composite 3D printing apparatus according to claim 2, wherein the lower end of the shielding case is abutted against the upper end of the enclosed wall.

4. The electron beam melting and cutting composite 3D printing apparatus according to claim 1, wherein the Y-direction movable platform is provided with a driving element and a Z-direction rod driven by the driving element to move up and down; the Z-direction rod is connected to the Z-direction movable platform.

5. The electron beam melting and cutting composite 3D printing apparatus according to claim 4, wherein the Y-direction movable platform is provided with a plurality of Z-direction positioning rods, and the plurality of Z-direction positioning rods movably run through the Z-direction movable platform.

6. The electron beam melting and cutting composite 3D printing apparatus according to claim 5, wherein the plurality of Z-direction positioning rods are arranged around a periphery of the Z-direction rod.

* * * * *